United States Patent [19]

Alligood et al.

[11] Patent Number: 5,150,149
[45] Date of Patent: Sep. 22, 1992

[54] MULTI-APERTURE ELECTROMAGNETIC CAMERA SHUTTER

[75] Inventors: John H. Alligood, Penfield; John H. Minnick, Rochester; David A. Castor, Webster, all of N.Y.

[73] Assignee: Eastman Kodak Company, Rochester, N.Y.

[21] Appl. No.: 735,982

[22] Filed: Jul. 25, 1991

[51] Int. Cl.$^5$ .................. G03B 7/08; G03B 9/08
[52] U.S. Cl. .................. 354/441; 354/231; 354/234.1; 354/258.1
[58] Field of Search ............ 354/456, 440, 446, 234.1, 354/235.1, 250, 227.1, 258.1, 271.1, 435, 439, 448, 228, 231, 441, 442, 443, 444, 445

[56] References Cited

U.S. PATENT DOCUMENTS

| | | | |
|---|---|---|---|
| 2,983,207 | 5/1961 | Gebele | 354/412 |
| 3,098,418 | 7/1963 | Reiher et al. | 354/173.1 |
| 3,709,137 | 1/1973 | Starp | 354/448 |
| 3,833,913 | 9/1974 | Wick et al. | 354/448 |
| 3,928,859 | 12/1975 | Peterson | 354/400 |
| 4,074,289 | 2/1978 | Nobusawa | 354/441 |
| 4,106,041 | 8/1978 | Lange | 354/206 |
| 4,201,460 | 5/1980 | Stemme et al. | 354/173.1 |
| 4,294,527 | 10/1981 | Hashimoto et al. | 354/412 |
| 4,344,678 | 8/1982 | Mizokami | 354/452 |
| 4,361,387 | 11/1982 | Cloutier | 354/412 |
| 4,648,701 | 3/1987 | Ogihara et al. | 354/439 |
| 4,881,093 | 11/1989 | Dowe | 354/234.1 |

Primary Examiner—L. T. Hix
Assistant Examiner—J. K. Han
Attorney, Agent, or Firm—Ronald M. Reichman

[57] ABSTRACT

A single electromagnet and a single permanent magnet to actuate a shutter blade and a plurality of aperture blades, that form a plurality of aperture openings. A magnet is coupled to an electormagnet and an aperture adjustment mechanism. The magnet rotates in one direction to set the aperture opening and then rotates in the opposite direction to actuate a shutter blade.

27 Claims, 6 Drawing Sheets

MULTI-APERTURE ELECTROMAGNETIC CAMERA SHUTTER

RELATED APPLICATIONS

Reference is made to commonly assigned copending patent applications: U.S. Ser. No. 735,510 entitled "A DEVICE AND METHOD FOR ELECTROMAGNETICALLY ACTIVATING THE SHUTTER OF A CAMERA" filed herewith in the names of J. Kelly Lee, David R. Dowe and Tom M. Seamans; U.S. Ser. No. 735,980 entitled "SELF CENTERING BI-DIRECTIONAL ELECTROMAGNETIC ACTUATOR" filed herewith in the names of David A. Castor, Tom M. Seamans, J. Kelly Lee, and David R. Dowe; and U.S. Ser. No. 735,489 entitled "A MAGNET AND SHUTTER ASSEMBLY FOR AN ELECTROMAGNETIC SHUTTER" filed herewith in the names of Jude A. Sangregory and Robert L. Kuhn, Jr.

BACKGROUND OF THE INVENTION

1. Field of the Invention

The invention relates generally to the field of photography, and particularly to a multi-aperture electromagnetic camera shutter.

2. Description of the Prior Art

Leaf type or blade type mechanical shutters have been used to regulate the amount of light that is going to reach the imaging areas of a filmstrip contained within a camera. Typically, the leaf type of shutter is an array of metal "blades" that are pivoted so that they all swing towards or away from the lens aperture of the camera. When the shutter is closed, all the blades are overlapping in the center of the lens aperture and no light reaches the filmstrip. When the shutter is open, the blades pivot away from the center of the aperture, so that light may pass through the aperture and expose the filmstrip. Sometimes an array of metal blades are not used, and the leaf type mechanical shutters may have one or more blades, each of which may have a different diameter opening. When a picture is taken the blade or blades swing away from the center of the lens aperture so that light may pass through the aperture, through the blade or blade openings to expose the filmstrip. If a picture is not being taken, the shutter will be closed. Hence, one blade may block the opening of the other blade, or both blades openings may not be in optical alignment with the aperture. The power to open and close the leaf type mechanical shutters is provided by a spring or springs that are under tension, and the timing is controlled by a watch-type gear train.

The size of the aperture opening may be controlled by an iris diaphragm. Essentially an iris diaphragm is one or more movable aperture blades that form different size aperture openings, by covering different portions of the aperture opening. If the iris diaphragm was electromagnetically actuated, a electromagnet was used to control the aperture blades and a different electromagnet was used to control the shutter.

Electromagnetic shutters have been developed to reduce the amount of energy or power that is required to open and close leaf type mechanical shutters. Electromagnetic shutters are faster than mechanical shutters from 4 mm diameter to 20 mm diameter aperture openings and electromagnetic shutters may be controlled with greater accuracy than mechanical shutters. The manufacturing cost of an electromagnetic shutter is less than the manufacturing cost of mechanical shutters.

Some of the disadvantages of prior art electromagnetic powered shutters are: the solenoids used a large amount of current, i.e. approximately 2 amps; the solenoid had no intermediate positions, i.e., the solenoid and the lens aperture was either open or closed; and the solenoids were slow due to the inertia required to move the large mass of the solenoids plunger.

SUMMARY OF THE INVENTION

The present invention overcomes the disadvantages of the prior art by using a single electromagnet and a single permanent magnet to actuate a shutter blade and a plurality of aperture blades that form a plurality of aperture openings. This invention includes a magnet that is coupled to an electromagnet and an aperture adjustment mechanism. The magnet rotates in one direction to cause the aperture adjustment mechanism to set an aperture opening and then the magnet rotates in the opposite direction to actuate a shutter blade.

The foregoing is achieved by providing:

an armature comprising: a core; and a coil, the coil is capable of receiving current and the armature will produce a first magnetic field;

a magnet that produces a second magnetic field, the magnet is coupled to the first magnetic field;

means coupled to one or more of the aperture blades for moving one or more of the aperture blades to different positions to form a plurality of aperture openings;

a moveable member that is coupled to the magnet and the moving means for moving the means and one or more of the shutter blades past the aperture opening; and means coupled to the armature for controlling the presence or absence of the first magnetic field and the polarity of the first magnetic field so that if the armature has one polarity said magnet will move the member and one or more of the aperture blades to form an aperture opening and if said armature has a second polarity the magnet will move the member and one or more shutter blades past the opening formed by the aperture blades and allow light to enter the optical path of the camera;

whereby, each time said controlling means causes the magnet to move the member and the member moves the aperture blades, the aperture blades will form a different aperture opening.

DESCRIPTION OF A PREFERRED EMBODIMENT

Figure 1:
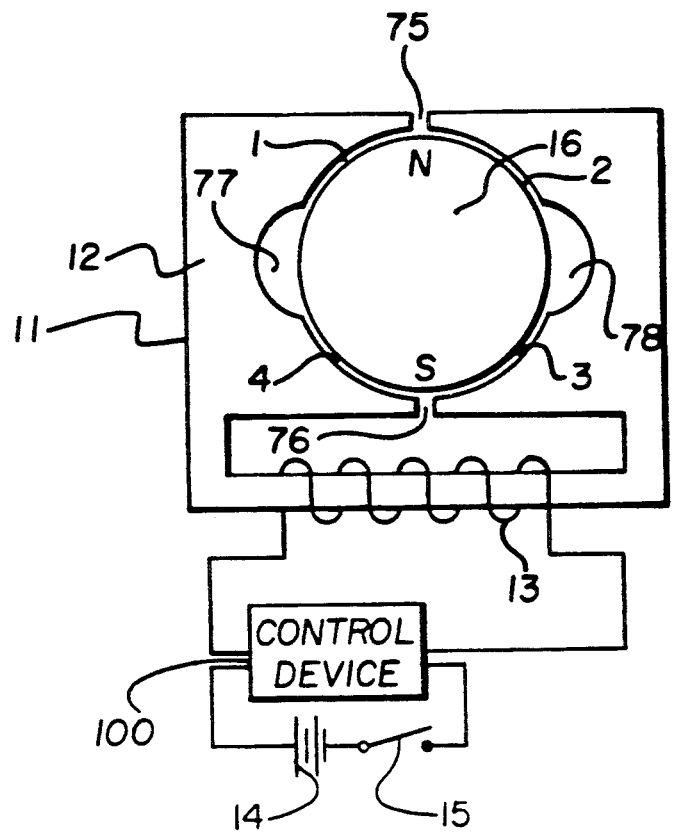
FIG. 1 is a diagram that illustrates the operation of this invention by showing a magnet in one position.

Referring now to the drawings in detail, and more particularly to FIG. 1, the reference character 11 represents an armature that includes a core 12 and coil 13. Air gaps 1, 2, 3, 4, 75, 76, 77 and 78 appear in armature 11. Switch 15 is connected to one of the ends of control device 100 and one of the terminals of battery 14. The second terminal of battery 14 is connected to polarity controlling device 100. Device 100 is also connected to both ends of coil 13. Device 100 controls the direction in which current pulses travel in coil 13. The manner in which the coil current is controlled will be more fully set forth in the description of FIG. 7.

Cylindrically shaped permanent magnet 16, which has a North pole (that is indicated on the drawings by the letter N) and a South pole (that is indicated on the drawings by the letter S) is positioned in armature 11 in a manner that gaps 1, 2, 3, 4, 75, 76, 77 and 78 will be present. When switch 15 is open, no current will be supplied to coil 13 and magnet 16 will be positioned in a neutral position as shown in FIG. 1.

Figure 2:
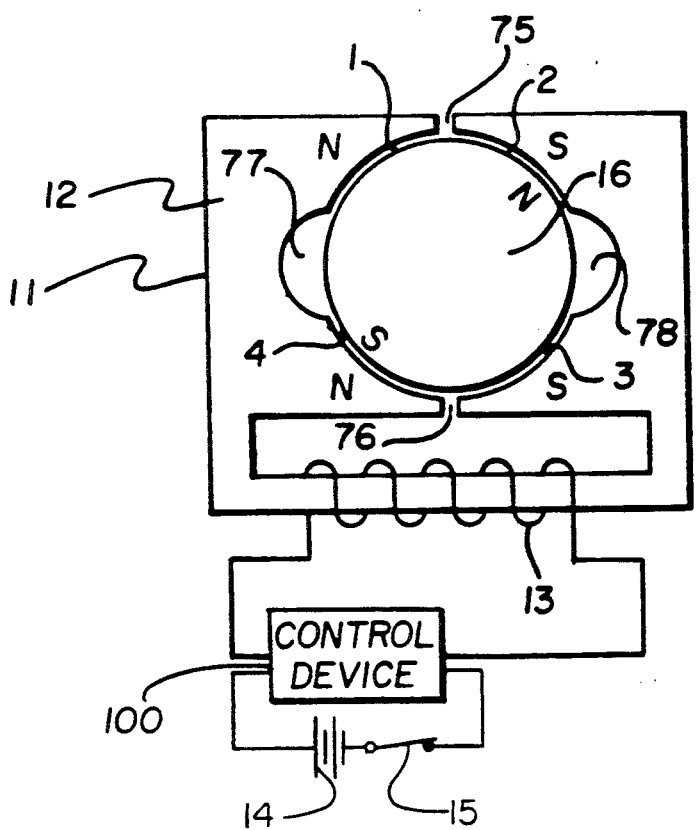
FIG. 2 is a diagram that illustrates the operation of this invention by showing a magnet in a different position.

FIG. 2 illustrates the device shown in FIG. 1 with shutter switch 15 closed. The description of FIG. 7 will describe how device 100 causes current pulses to be transmitted from battery 14 to point 41 through coil 13 to point 42 and back to battery 14 or how device 100 causes current pulses to be transmitted from battery 14 to point 42 through coil 13 to point 41 and back to battery 14.

The closing of switch 15 causes a current from battery 14 to appear in coil 13 and coil 13 to induce a magnetic field. The magnetic field causes the left side of core 12 to act as a North pole and the right side of core 12 to act as a South pole. The electromagnetic flux from armature 11 will interact directly with the magnetic flux of magnet 16 causing magnet 16 to rotate. The North pole of core 12 will attract the South pole of magnet 16 and cause magnet 16 to move to the position which is shown in FIG. 2.

Figure 3:
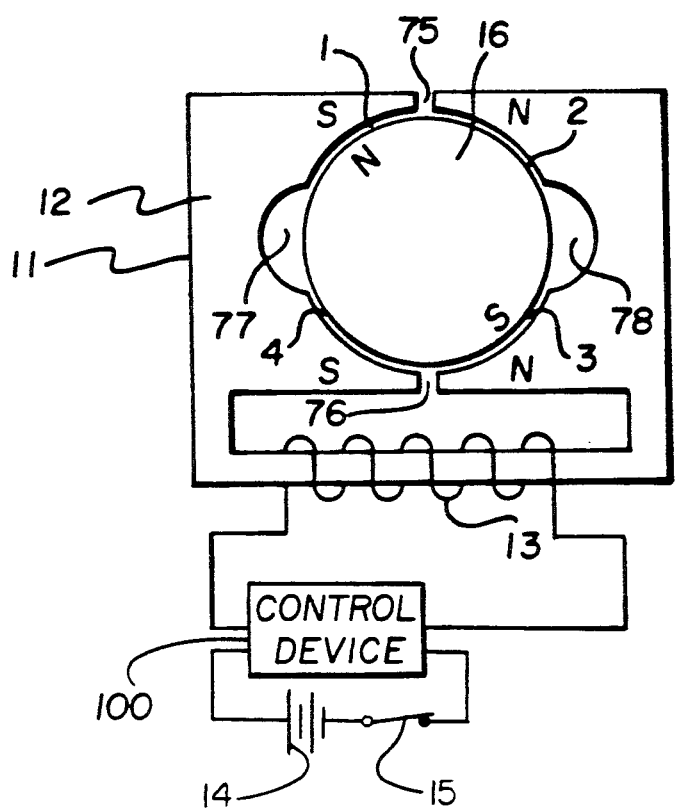
FIG. 3 is a diagram that illustrates the operation of this invention by showing a magnet in a still different position.

FIG. 3 depicts the device shown in FIG. 1 with shutter switch 15 closed. The description of FIG. 7 will describe how device 100 causes current pulses to be transmitted from battery 14 to point 41 through coil 13 to point 42 and back to battery 14 or how device 100 causes current pulses to travel from battery 14 to point 42 through coil 13 to point 41 and back to battery 14.

The closing of switch 15 causes a current from battery 14 to appear in coil 13 and coil 13 to induce a magnetic field. The magnetic field causes the right side of core 12 to act as a North pole and the left side of core 12 to act as a South pole. The electromagnetic flux from armature 11 will interact directly with the magnetic flux of magnet 16 causing magnet 16 to rotate.

Figure 4:
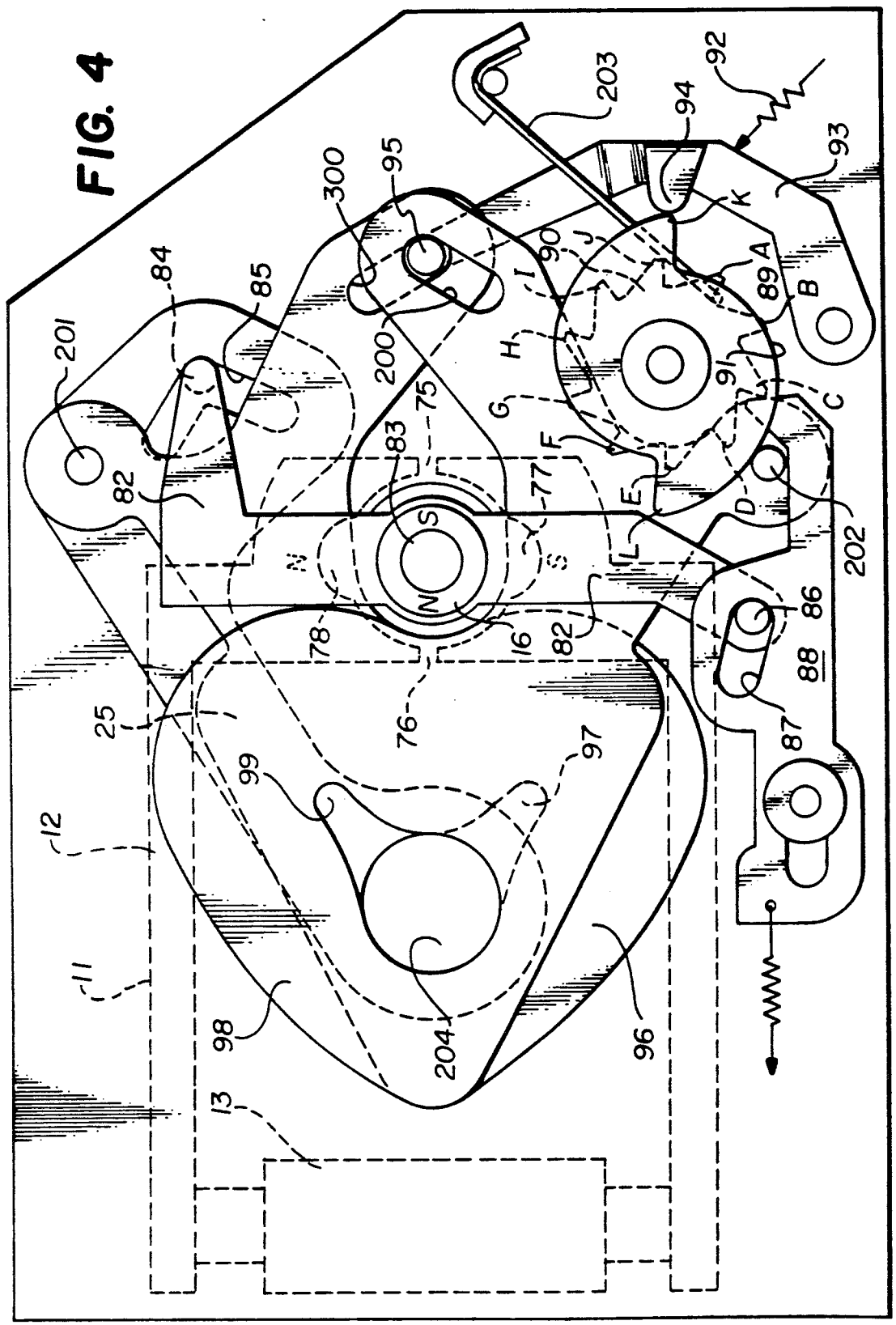
FIG. 4 is a diagram that illustrates the manner in which shutter blade 25 and aperture blades 96 and 98 interact with magnet 16 and armature 11.

FIG. 4 illustrates the manner in which shutter blade 25 and aperture blades 96 and 98 interact with armature 11 and magnet 16. Armature 11 includes a core 12 and coil 13. Permanent magnet 16, which has a North pole (that is indicated on the drawings by the letter N) and a South pole (that is indicated on the drawings by the letter S) is positioned in armature 11 in a manner that gaps 75, 76, 77 and 78 will be present. The magnetic field induced by armature 11 interacts with the magnetic field produced by magnet 16.

Actuation lever 82 is connected to magnet 16 by bearing pin 83. Pin 84 couples slot 85 of blade 25 to actuator lever 82. Actuator lever 82 is coupled to slot 87 of pawl index 88 by pin 86. Ratchet/cam 89 has two components: a inner ratchet surface 90, that has ten teeth (A,B,C,D,E,F,G,H,I, and J); and an outer cam surface 91, that has two cam surfaces (K and L). Home position sensor 103 shown in FIG. 7 detects the position of teeth A and F. Spring 92 holds projection arm 94 of cam follower/lever 93 in contact with surfaces K or L of surface 91 of ratchet/cam 89. Pin 95 connects one end of lever 93 to aperture blade 96 (which has an aperture orifice 97) and to aperture blade 98 (which has an aperture orifice 99). Pin 95 rests in slot 300 and aperture blade 96 pivots about pin 201. Pin 95 rests in slot 200 and aperture blade 98 pivots about pin 202. Anti-backup device 203 is connected to cam 89 to prevent cam 89 from moving in a backwards direction i.e. towards pawl 88.

The closing of switch 15 (not shown) causes a current from battery 14 (not shown) to appear in coil 13 and coil 13 to induce a magnetic field. The magnetic field causes the top side of core 12 to act as a North pole and the bottom side of core 12 to act as a South pole. The electromagnetic flux from armature 11 will interact directly with the magnetic flux of magnet 16 causing magnet 16 to rotate. The North pole of core 12 will attract the South pole of magnet 16 and cause magnet 16 to rotate counter-clockwise.

When magnet 16 rotates counter-clockwise, magnet 16 moves actuator lever 82 to the right. Which causes pin 86 of lever 82 to move to the right hand side of slot 87 and push pawl index 88 to the right. Pawl 88 will move tooth C of cam 89 counter-clockwise one tooth position i.e. to the present position of tooth B and cam surface K of cam 89 will move projection 94 of lever 93 down towards the present position of tooth A. Lever 93 will cause pin 95 to move in slots 200 and 300. Which will cause aperture blade 96 to pivot on pin 201 and aperture blade 98 to pivot on pin 202. Aperture blades 96 and 98 will pivot to their fully closed position and allow no light to pass through aperture 204. Aperture blades 96 and 98 are shown in FIG. 7 in their fully open position and are allowing the maximum amount of light to enter aperture 204.

Thus, the aperture settings are controlled by the movement of pin 95 of lever 93 in slots 200 and 300.

When aperture settings are made pin 84, which connects shutter blade 25 to lever 82, will move in slot 85. Slot 85 is V shaped to prevent shutter blade 25 from opening when lever 82 moves pin 84 to change the aperture setting.

Figure 7:
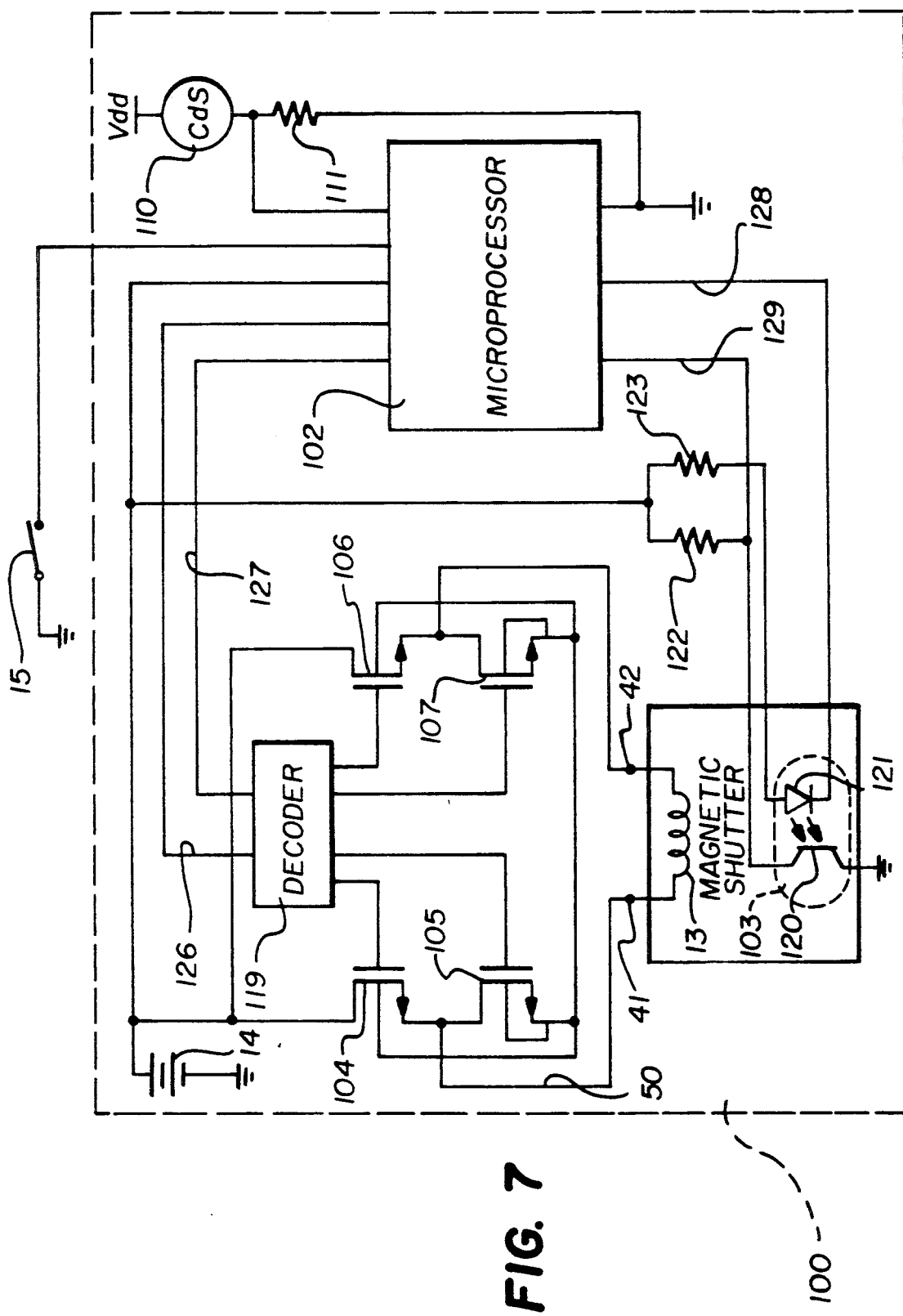
FIG. 7 is a schematic block diagram of the device for controlling the polarity of the coil shown in FIGS. 1-3.

After the aperture is set, the electronics described in FIG. 7 will change the direction in which current pulses travel in coil 13 so that the poles of core 12 will have a polarity that is opposite to the polarity that was previously described. The magnetic field now causes the top side of core 12 to act as a South pole and the bottom side of core 12 to act as a North pole. The electromagnetic flux from armature 11 will interact directly with the magnetic flux of magnet 16 causing magnet 16 to rotate. The North pole of core 12 will attract the South pole of magnet 16 and cause magnet 16 to rotate clockwise.

When magnet 16 rotates clockwise, magnet 16 moves actuator lever 82 clockwise. Pin 84 of lever 82 will move in V shaped slot 85 and cause shutter blade 25 to open, so that a picture may be taken.

The device shown in FIG. 4 is capable of having four different aperture settings. The number of aperture setting are determined by the number of teeth on ratchet 90. In FIG. 4 ratchet 90 has ten teeth and four different aperture settings. FIG. 4 illustrates aperture blades 96 and 98 in a fully open position.

If tooth A is aligned with cam surface K of cam 89, aperture 204 will be fully closed and ratchet 90 will be in its home position.

If the current pulses travelling through coil 13 are in the same direction and turned on and off:

one time tooth B will be aligned with cam surface K of cam 89 and aperture 204 will be set at f/16;

two times tooth C will be aligned with cam surface K of cam 89 and aperture 204 will be set at f/10;

three times tooth D will be aligned with cam surface K of cam 89 and aperture 204 will be set at f/6;

four times tooth E will be aligned with cam surface K of cam 89 and aperture 204 will be fully open at f/2.8;

Each time the current pulses travelling through coil 13 are turned off, magnet 16 moves to its neutral position and aperture blades 96 and 98 will not move.

When the direction of current pulses to coil 13 is reversed (which may occur at any time before or after the first through fourth same direction current pulses in coil 13) magnet 16 direction of rotation will reverse, lever 82 will move and cause shutter blade 25 to take a picture, at the aperture setting that aperture blades 96 and 98 currently are forming. The duration of the current pulse will determine the shutter speed of shutter blade 25.

After the pulse that is used to take the picture is completed and the picture is taken, magnet 16 will move to its neutral position and a current pulse will be supplied to coil 13 in the opposite direction causing the next tooth to be aligned with cam surface K. If cam 89 is in its home position the next picture taking sequence may begin. If home sensor 103 does not detect cam 89 to be in its home position additional same directional pulses will be transmitted through coil 13 until the circuit illustrated in FIG. 7 senses that cam 89 and ratchet 90 are in their home position. Cam 89 and ratchet 90 turn only 180 degrees in each picture taking cycle.

At the beginning of the next picture taking sequence tooth F is aligned with cam surface K of cam 89, aperture 204 will be fully closed and cam 89 and ratchet 90 will be in their home position.

If the current pulses to coil 13 is in the same direction and turned on and off:

one time tooth G will be aligned with cam surface K of cam 89 and aperture 204 will be set at f16;

two times tooth H will be aligned with cam surface K of cam 89 and aperture 204 will be set at f/10;

three times tooth I will be aligned with cam surface K of cam 89 and aperture 204 will be set at f/6; and four times tooth J will be aligned with cam surface K of cam 89 and aperture 204 will be fully open at f/2.8.

When the direction of current pulses to coil 13 is reversed (which may occur at any time before or after the first through fourth same direction current pulses in coil 13) magnet 16 direction of rotation will reverse, lever 82 will move and cause shutter blade 25 to take a picture, at the aperture setting that aperture blades 96 and 98 currently are forming. The duration of the current pulse will determine the shutter speed of shutter blade 25.

After the pulse that is used to take the picture is completed and the picture is taken, magnet 16 will move to its neutral position and a current pulse will be supplied to coil 13 in the opposite direction causing the next tooth to be aligned with cam surface K. If cam 89 is in its home position the next picture taking sequence may begin. If home sensor 103 does not detect cam 89 to be in its home position additional same directional pulses will be transmitted through coil 13 until the circuit illustrated in FIG. 7 senses that cam 89 and ratchet 90 are in their home position. Cam 89 and ratchet 90 turn only 180 degrees in each picture taking cycle.

At the beginning of the next picture taking sequence tooth A will be aligned with cam surface K of cam 89, aperture 204 will be fully closed and cam 89 and ratchet 90 will be in their home position and the above procedure will be repeated.

Figure 5:
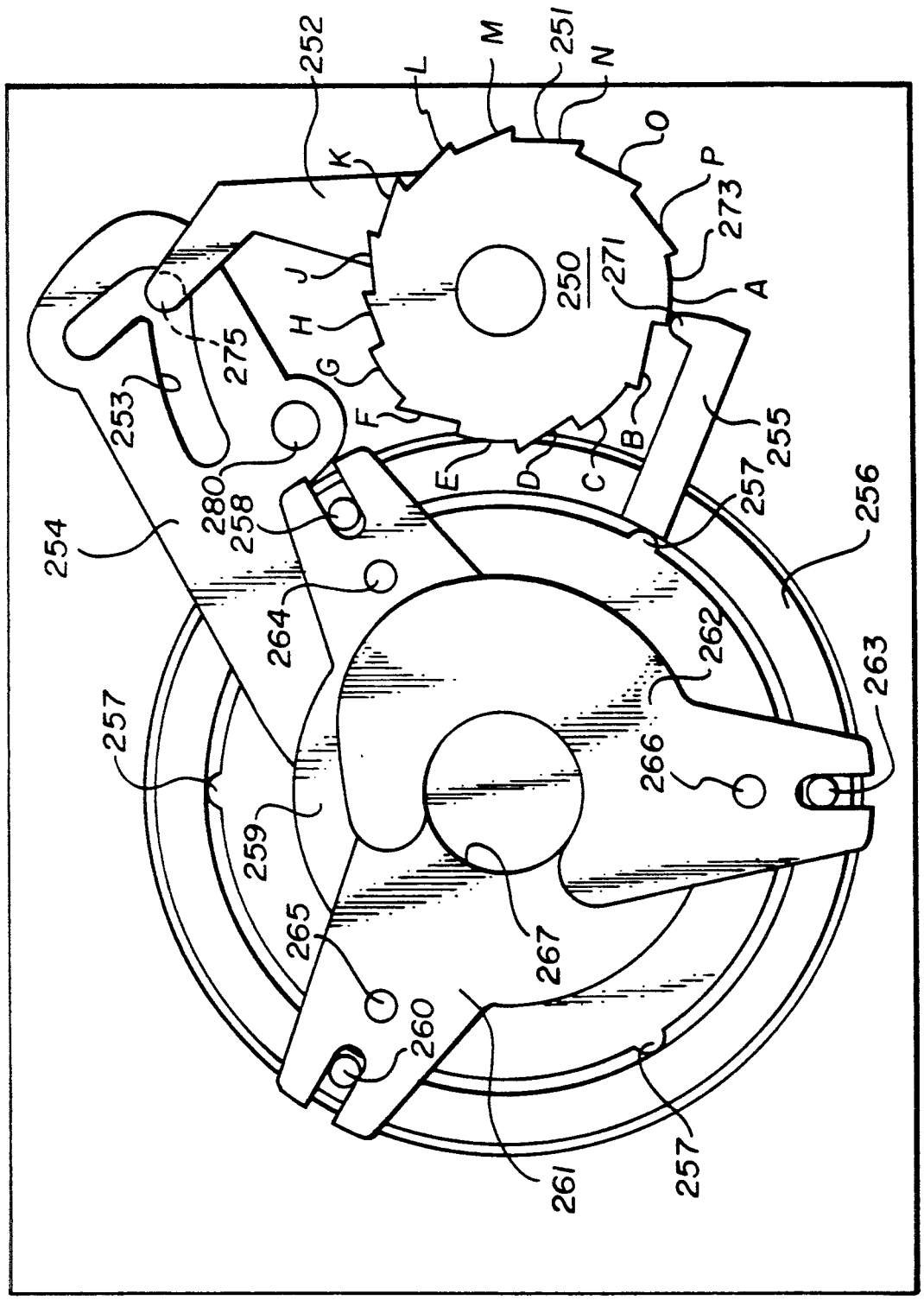
FIG. 5 is a diagram that illustrates three aperture blades and a shutter blade interacting with magnet 16 and armature 11.

FIG. 5 is an alternate embodiment of this invention that illustrates three or more aperture blades and a single shutter blade forming a plurality of aperture openings. Aperture set cam 250 is driven by ratchet driver 276 (shown in FIG. 6).

Cam 250 has eight positioning teeth 251 and seven radii steps 273 positioned along its outer circumference. The number of radii steps 273 (each radii step represents a aperture opening) will determine the number of available aperture openings. Thus, if additional aperture openings are desired, cam 250 will have additional radii steps. Actuator 252 is coupled to slot 253 of shutter blade 254 by pin 275. Shutter blade 254 pivots about pin 280. Arm 255 of aperture set ring 256 has a cam follower 271. Cam follower 271 meshes with teeth 251 and radii steps 273 of aperture cam 250, thus, controlling the rotational position of aperture set ring 256.

Each radii step has a different radius. Hence, radius A will be larger than radius B and radius B will be larger than radius C. Radius C will be larger than radius D and radius D will be larger than radius E. Radius E will be larger than radius F and radius F will be larger than radius G. Radius G will be larger than radius H. Steps 273 have different size radii so that different aperture settings may be formed.

Ring 256 turns on bearings (not shown) that are positioned in locations 257. Pin 258 connects aperture blade 259 to ring 256 and pin 260 connects aperture blade 261 to ring 256. Aperture blade 262 is connected to ring 256 by pin 263. Aperture blade 259 pivots about pin 264 and aperture blade 261 pivots about pin 265. Aperture blade 262 pivots about pin 266. Blades 259, 261 and 262 are shown in their maximum open position forming aperture opening 267. It is realized that additional pins may be used to connect additional aperture blades to ring 256 to improve the control of the formation of aperture opening 267.

Passing current through coil 13 in the proper direction will cause magnet 16 to rotate cam 251 counterclockwise. The manner in which the direction and duration of current flow are determined will be described in the description of FIG. 7.

The apparatus of this inventions home or starting position is with cam follower 271 touching cam 250 at point A, thereby causing aperture blades 259, 261 and 262 to form a first aperture opening at f/2.8.

The first and subsequent current pulses in coil 13 will cause cam 250 to rotate counter-clockwise the distance occupied by a tooth 251 or the distance occupied by a radii step 273. The rotation of cam 250 will cause cam follower 255 of aperture set ring 256 to move from point A to point B and cause aperture set ring 256 to rotate. A spring (not shown) on aperture set ring 256 will cause cam follower 271 to maintain contact with cam 250. Whereupon, aperture blades 259, 261 and 262 will form a second aperture opening and aperture 267 will be set at f/4. When the current flow to coil 13 is turned off, magnet 16 will move to its neutral position and aperture blades 259, 261 and 262 will not move.

The second same direction current pulse in coil 13, will cause projection arm 255 of aperture set ring 256 to move from point B to point C, which will cause aperture set ring 256 to rotate aperture blades 259, 261 and 262 to form a third aperture opening, which will be set at f/6.

The third same direction current pulse in coil 13, will cause projection arm 255 of aperture set ring 256 to move from point C to point D, which will cause aperture set ring 256 to rotate aperture blades 259, 261 and 262 to form a fourth aperture opening, which will be set at f/8.

The fourth same direction current pulse in coil 13, will cause projection arm 255 of aperture set ring 256 to move from point D to point E, which will cause aperture set ring 256 to rotate aperture blades 259, 261 and 262 to form a fifth aperture opening, which will be set at f/10.

The fifth same direction current pulse in coil 13, will cause projection arm 255 of aperture set ring 256 to move from point E to point F, which will cause aperture set ring 256 to rotate aperture blades 259, 261 and 262 to form a sixth aperture opening, which will be set at f/14.

The sixth same direction current pulse in coil 13, will cause projection arm 255 of aperture set ring 256 to move from point F to point G, which will cause aperture set ring 256 to rotate aperture blades 259, 261 and 262 to form a sixth aperture opening, which will be set at f/16.

The seventh through fifteenth same direction current flows in coil 13, will cause projection arm 255 of aperture set ring 256 to move respectively from points H, J, K, L, M, N, O and P of teeth 251, which will cause aperture set ring 256 to reset to its initial position i.e. the position shown in FIG. 5. Under the above condition no picture would be taken.

Each time the current flow to coil 13 was turned off, magnet 16 (shown in FIG. 6) moved to its neutral position and aperture blades 259, 261 and 262 did not move.

When the direction of current flow to coil 13 is reversed (which may occur at any time before or after the first through seventh same direction current pulses in coil 13) actuator 252 moves in a clockwise direction and pin 275 of actuator 252 moves towards the right hand side of slot 253 of shutter blade 254. The foregoing will cause shutter blade 254 to open and take a picture, at the aperture setting that blades 259, 261 and 262 currently formed. The duration of current flow will determine the shutter speed of shutter blade 254. After the picture is taken, magnet 16 will move back to its neutral position.

Figure 6:
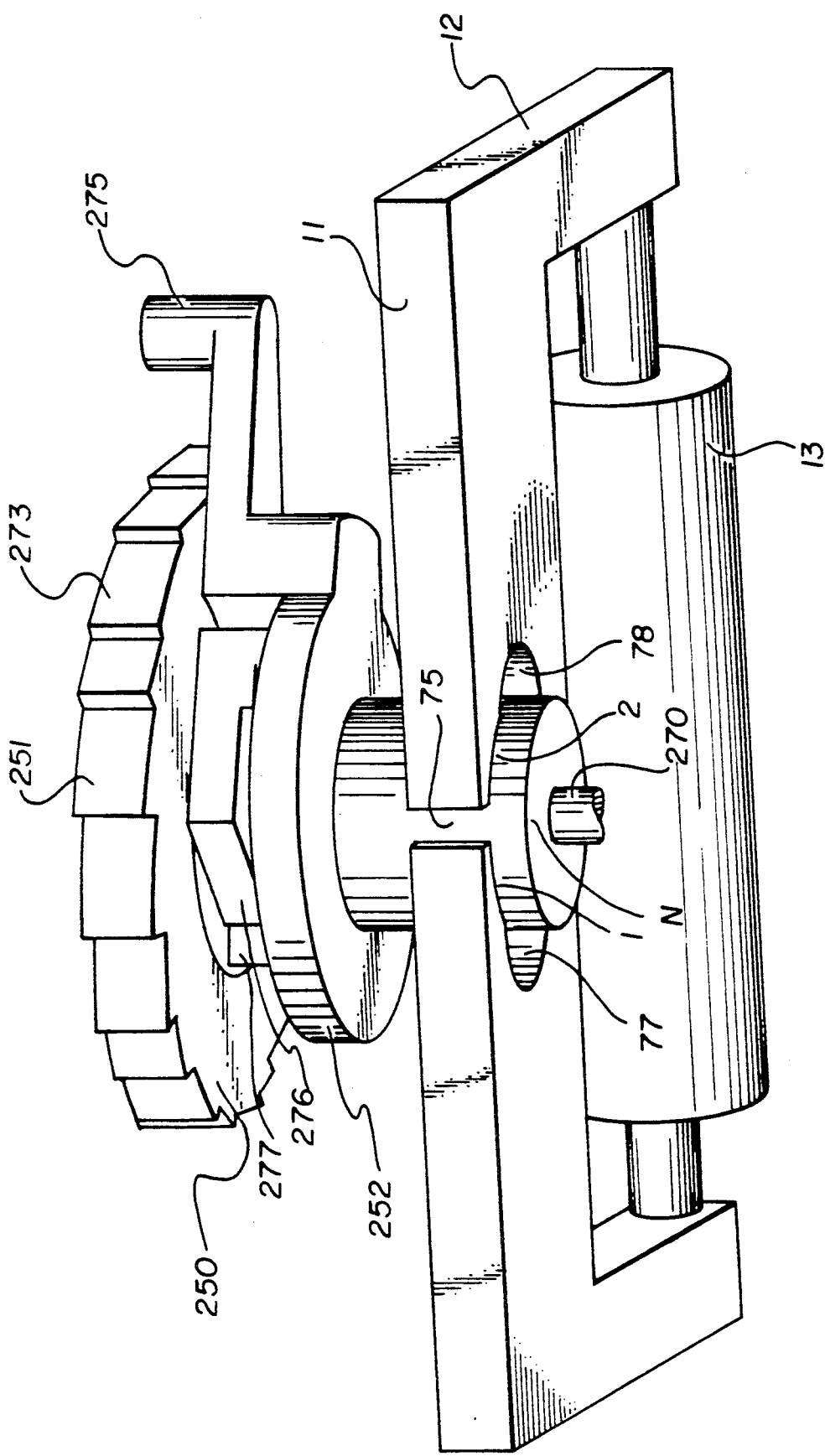
FIG. 6 is a diagram that illustrates cam 250 of FIG. 5 and the components under cam 250.

FIG. 6 depicts cam 250 of FIG. 5 and the manner in which cam 250 is coupled to magnet 16 and armature 11. Magnet 16 is positioned in armature 11 (which has a core 12 and coil 13) in a manner that gaps 1, 2, 3, 4, 75, 76, 77 and 78 will be present. Gaps 3, 4 and 76 are not seen in FIG. 6. Shaft 270 passes through the center of magnet 16 and connects magnet 16 to actuator 252 by forming an interference fit. Ratchet driver is coupled to actuator 252. Aperture cam 250 has teeth 277 which are driven by ratchet driver 276, when aperture opening 267 is being changed.

The closing of switch 15 (not shown) causes a current from battery 14 (not shown) to appear in coil 13 and coil 13 to induce a magnetic field. The magnetic field causes the left side of core 12 to act as a North pole and the right side of core 12 to act as a South pole. The electromagnetic flux from armature 11 will interact directly with the magnetic flux of magnet 16 causing magnet 16 to rotate. The North pole of core 12 will attract the South pole of magnet 16 and cause magnet 16 to rotate counter-clockwise.

When magnet 16 rotates counter-clockwise, magnet 16 turns actuator 252 counter-clockwise. Which causes tooth 277 of cam 250 to turn one tooth 251 or one radii step 273 counter-clockwise. The electronics described in FIG. 7 determines what aperture setting the camera should have. Hence, the electronics described in FIG. 7 will determine how many times the current to coil 13 is turned on and off, which will determine the number of radii steps 273 that are utilized to form the selected aperture opening.

Once the correct aperture opening is selected the electronics described in FIG. 7, will reverse the direction of current flow in coil 13. The current flow in coil 13 will induce a magnetic field in armature 11. The magnetic field causes the left side of core 12 to act as a South pole and the right side of core 12 to act as a North pole. The electromagnetic flux from armature 11 will interact directly with the magnetic flux of magnet 16 causing magnet 16 to rotate. The North pole of core 12 will attract the South pole of magnet 16 and cause magnet 16 to rotate clockwise.

When magnet 16 rotates clockwise, magnet 16 turns actuator 252 clockwise. Which causes pin 275 of actuator 250 to move in slot 253 (FIG. 6) of shutter blade 254. The foregoing will cause shutter blade 254 to open and take a picture, at the aperture setting that blades 259, 261 and 262 currently form. After the picture is taken, magnet 16 will move back to its neutral position.

FIG. 7 describes polarity controlling device 100 that was shown in FIGS. 1-3. CdS light sensor 110 has two terminals. The first terminal is connected to a voltage source and the second terminal is connected to the one of the ends of biasing resistor 111. The second terminal of sensor 110 is also coupled to one of the inputs of microprocessor 102. The other end of resistor 111 is connected to ground and to microprocessor 102. Switch 15 is connected to the negative terminal of battery 14 and to one of the inputs of microprocessor 102. Battery 14 is coupled to: one of the inputs of microprocessor 102; one of the ends of resistor 122; one of the ends of resistor 123; the source input of FET 104; and the source input of FET 106. The aperture select output of microprocessor 102 is transmitted to one of the inputs of decoder 119 via line 126 and the shutter time output of microprocessor 102 is transmitted to decoder 119 via line 127.

Decoder 119 has four outputs. The first output of decoder 119 is connected to the gate of FET 104 and the second output of decoder 119 is connected to the gate of FET 105. The third output of decoder 119 is connected to the gate of FET 107 and the fourth output of decoder 119 is connected to the gate of FET 106. The drain of FET 104 is tied to the source of FET 105 and the drain of FET 104 is also connected to one of the ends of coil 13 via wire 50. The drain of FET 105 is connected to: the source of FET 104; the source of FET 106; the drain of FET 107 and to ground. The drain of FET 106 is connected to one of the ends of coil 13 and the source of FET 107. The drain of FET 107 is connected to ground.

Home position feedback sensor 103 comprises: photo transistor 120 and LED 121. The emitter of transistor 120 is connected to ground and the collector of transistor 120 is connected to one of the outputs of microprocessor 102. The collector of transistor 120 is also connected to one of the ends of biasing resistor 122. One of the outputs of microprocessor 102 is connected to one of the ends of LED 121. The other end of LED 121 is connected to one of the ends of biasing resistor 123. Microprocessor 102 is also connected to ground.

Home position sensor 103 is located on teeth A and F of cam 89 of FIG. 4 and is aligned with the radii step 273 on cam 250 of FIG. 5 that has a radius A. Sensor 103 is utilized to determine the orientation of teeth A-J of cam 89 of FIG. 4 and the orientation of teeth 251 and radii steps 273 of cam 250 of FIG. 5 and FIG. 6. Cams 89 and 250 always have to start at some orientation of teeth A-J and of teeth 251 and radii steps 273. If cam 89 and cam 250 respectively always start at the same orientation of teeth A-J and of teeth 251 and radii steps 273, the movement of a specific number of teeth A-J and of teeth 251 and radii steps 273 will always cause aperture blades 96 and 98 of FIG. 4 and aperture blades 259, 261 and 262 of FIG. 5 to form the same aperture opening.

Any specific orientation of teeth A-J and of teeth 251 and radii steps 273 may be selected as the starting orientation or home position of teeth A-J and of teeth 251 and radii steps 273. Thus, when switch 15 is depressed and microprocessor 102 entered into the exposure sequence, microprocessor 102 would check that teeth A-J of cam 89 and teeth 251 and radii steps 273 of cam 250 were in their home position, by transmitting a signal to sensor 103 via line 128. Transistor 120 will be turned on when teeth A-J of cam 89 and teeth 251 and radii steps 273 of cam 250 are in their home position. Transistor 120 will inform microprocessor 102 of this fact by transmitting a signal to microcessor 102 via line 129. If microprocessor 102 did not receive a signal on line 129 teeth A-J, teeth 251 and radii steps 273 were not in their home position. Then and in that event microprocessor 102 would cause teeth A-J, teeth 251 and radii steps 273 to be driven home by transmitting one or more current pulses through coil 13. The direction of current flow will be from point 41 on line 50 through coil 13 to point 42.

When transistor 120 informs microprocessor 102 that teeth A-J, teeth 251 and radii steps 273 are in their home position, microprocessor 102 would read the amount of light sensed by CdS 110, as a voltage. The voltage value would determine which aperture setting should be used and the shutter pulse time required.

The following values would be used for the embodiment shown in FIG. 4:

If the scene illumination noted by the circuit described in FIG. 7 is greater than or equal to 1,000 Foot Lamberts, then the voltage drop across resistor 111 of FIG. 7 (which is sensed by microprocessor 102) will be 5.2 volts and the current pulses flowing through coil 13 in the same direction will be turned on and off one time so that an aperture opening of f/16 will be formed;

If the scene illumination noted by the circuit described in FIG. 7 is greater than 500 Foot Lamberts, but less than 1,000 Foot Lamberts, then the voltage drop across resistor 111 of FIG. 7 (which is sensed by microprocessor 102) will be 4.7 volts and the current pulses flowing through coil 13 in the same direction will be turned on and off two times so that an aperture opening of f/10 will be formed;

If the scene illumination noted by the circuit described in FIG. 7 is greater than 300 Foot Lamberts, but less than 500 Foot Lamberts, then the voltage drop across resistor 111 of FIG. 7 (which is sensed by microprocessor 102) will be 4.2 volts and the current pulses flowing through coil 13 in the same direction will be turned on and off one time so that an aperture opening of f/6 will be formed; and If the scene illumination noted by the circuit described in FIG. 7 is less than 300 Foot Lamberts, then the voltage drop across resistor 111 of FIG. 7 (which is sensed by microprocessor 102) will be 3.2 volts and the current pulses flowing through coil 13 in the same direction will be turned on and off one time so that an aperture opening of f/2.8 will be formed.

The duration of the shutter pulse for the above settings would respectively be 7 msec., 7 msec., 10 msec., and 13 msec. and the direction of current pulse flow would be from point 41 on line 50 through coil 13 to point 42.

The following values would be used for the embodiment shown in FIG. 5 and FIG. 6:

If the scene is less than 125 Foot Lamberts: the voltage drop across resistor 111 (which is sensed by microprocessor 102) will be 2.5 volts or less; no current pulses will flow through coil 13 and the aperture will remain at f/2.8.

If the scene illumination noted by the circuit described in FIG. 7 is greater than or equal to 125 Foot Lamberts, but less than 200 Foot Lamberts, then the voltage drop across resistor 111 of FIG. 7 (which is sensed by microprocessor 102) will be 3.2 volts and the current pulses flowing through coil 13 in the same direction will be turned on and off one time so that an aperture opening of f/4 will be formed;

If the scene illumination noted by the circuit described in FIG. 7 is greater than or equal to 200 Foot Lamberts, but less than 400 Foot Lamberts, then the voltage drop across resistor 111 of FIG. 7 (which is sensed by microprocessor 102) will be 3.8 volts and the current pulses flowing through coil 13 in the same direction will be turned on and off two times so that an aperture opening of f/6 will be formed;

If the scene illumination noted by the circuit described in FIG. 7 is greater than or equal to 400 Foot Lamberts, but less than 600 Foot Lamberts, then the voltage drop across resistor 111 of FIG. 7 (which is sensed by microprocessor 102) will be 4.5 volts and the current pulses flowing through coil 13 in the same direction will be turned on and off three times so that an aperture opening of f/8 will be formed; and If the scene illumination noted by the circuit described in FIG. 7 is greater than or equal to 600 Foot Lamberts, but less than 800 Foot Lamberts, then the voltage drop across resistor 111 of FIG. 7 (which is sensed by microprocessor 102) will be 4.9 volts and the current pulses flowing through coil 13 in the same direction will be turned on and off four times so that an aperture opening of f/10 will be formed;

If the scene illumination noted by the circuit described in FIG. 7 is greater than or equal to 800 Foot Lamberts, but less than 1,000 Foot Lamberts, then the voltage drop across resistor 111 of FIG. 7 (which is sensed by microprocessor 102) will be 5.1 volts and the current pulses flowing through coil 13 in the same direction will be turned on and off five times so that an aperture opening of f/14 will be formed; and If the scene illumination noted by the circuit described in FIG. 7 is greater than or equal to 1,000 Foot Lamberts, then the voltage drop across resistor 111 of FIG. 7 (which is sensed by microprocessor 102) will be 5.3 volts and the current pulses flowing through coil 13 in the same direction will be turned on and off six times so that an aperture opening of f/16 will be formed.

The duration of the shutter pulse for the above settings would respectively be 13 msec., 11 msec., 10 msec., 7 msec., 6 msec., 6 msec. and 6 msec. and the direction of current pulse flow would be from point 41 on line 50 through coil 13 to point 42.

When switch 15 is depressed: teeth A-J, teeth 251 and radii steps 273 will be driven to their home position; CdS 110 will sense the amount of light that is Present; microprocessor 102 will determine the correct aperture opening and shutter speed from the above tables; and transmit the selected aperture to decoder 119 via line 126, as a binary code.

Microprocessor 102 decodes the above aperture codes and determines the number of pulses that are going to be transmitted to FETS 104 and 107. Decoder 119 would determine whether or not FETS 104 and 107 would be turned on. Each time the gates of FETS 104 and 107 received a pulse from decoder 119, FETS 104 and 107 caused current to flow on line 50 past point 41 through coil 13 to point 42 and back to transistor 107. Each time current was transmitted from point 41 through coil 13 to point 42, the left side of core 12 acted as a South pole. The foregoing caused magnet 16 to rotate counter-clockwise and pivot to the position shown in FIG. 3. Each time the current flow to coil 13 was turned off, magnet 16 would rotate to its neutral position i.e. the position shown in FIG. 1. The above procedure would continue until magnet 16 caused the movement of the appropriate number of teeth A-J, teeth 251 and radii steps 273.

After the current passing through coil 13 was turned on and off the correct no of times i.e. the correct number of pulses were transmitted through coil 13, microprocessor 102 would transmit the selected shutter time to decoder 119 via line 127.

Microprocessor 102 decodes the above shutter codes and determines the number of pulses that are going to be transmitted to FETS 105 and 106. Decoder 119 would determine whether or not FETS 105 and 106 would be turned on. When the gates of FETS 105 and 106 received a pulse from decoder 119, FETS 105 and 106 caused current to flow from battery 14, through FET 106, through point 42, through coil 13, through point 41 and back to FET 105. When the above was done, the left side of core 12 acted as a North pole. The foregoing caused magnet 16 to rotate clockwise and pivot to the position shown in FIG. 2, causing lever 93 (FIG. 4) to move shutter blade 25 away from aperture 204 for the duration of the above pulse. The above clockwise rotation of magnet 16 would also cause pin 275 (FIG. 5 and FIG. 6) of actuator 252 to move in slot 253 of shutter blade 254. The foregoing would cause shutter blade 254 to move away from aperture 267 for the duration of the above pulse.

If switch 15 was not depressed, i.e. if someone did not want to take a picture with the camera (not shown), no current would be supplied to coil 13 and magnet 16 would be in the neutral position shown in FIG. 1. Shutter blade 25 (FIG. 4) would be covering aperture 204 and shutter blade 254 (FIG. 5) would be covering aperture 267.

The above specification describes a new and improved multi-aperture electromagnetic camera shutter. It is realized that the above description may indicate to those skilled in the art additional ways in which the principles of this invention may be used without departing from the spirit. It is, therefore, intended that this invention be limited only by the scope of the appended claims.

What is claimed is:

1. A multi-aperture electromagnetic camera shuttering system that utilizes one or more aperture blades for producing a plurality of aperture openings and one or more shutter blades for regulating the amount of light that is allowed to enter the aperture openings, said system comprises:
    an armature comprising: a coil; and a coil, said coil is capable of receiving current and said armature will produce a first magnetic field;
    a magnet that produces a second magnetic field, said magnet is coupled to said first magnetic field;
    means coupled to one or more of said aperture blades for moving one or more of said aperture blades to different positions to form a plurality of aperture openings;
    a moveable member that is coupled to said magnet and said moving means for moving said means and one or more of said shutter blades past said aperture opening; and
    means coupled to said armature for controlling the presence or absence of said first magnetic field and the polarity of said first magnetic field so that if said armature has one polarity said magnet will move said member and one or more of said aperture blades to form an aperture opening and if said armature has a second polarity said magnet will move said member and said one or more shutter blades past said opening formed by said aperture blades and allow light to enter the optical path of said camera;
    whereby, each time said controlling means causes said magnet to move said member and said member moves said aperture blades, said aperture blades will form a different aperture opening.

2. The system claimed in claim 1 wherein said means for moving said one or more aperture blades comprises:
    a cam;
    a first member that is coupled to said moveable member and said cam so that when said moveable member moves said first member, said cam will move a predetermined distance; and
    a second member that is coupled to said first member, said cam and said one or more aperture blades so that when said first member moves said cam a predetermined distance, said second member will move one or more of said aperture blades to form a specified size aperture opening.

3. The system claimed in claim 2 wherein said first member is a pawl index.

4. The system claimed in claim 2 wherein said second member is a follower/lever.

5. The system claimed in claim 1 wherein said controlling means comprises:
    means for sensing the amount of light that is available to take a picture;
    means coupled to the output of said light sensing means for determining the polarity of said magnetic field; and
    means coupled to the output of said determining means and said coil for setting the polarity of said magnetic field.

6. The system claimed in claim 5 further including detecting means coupled to said determining means for noting the orientation of said moving means.

7. The system claimed in claim 6, wherein said detecting means is a sensor.

8. The system claimed in claim 5, wherein said light sensing means is a photocell that outputs voltages that are proportional to the amount of light said photocell senses.

9. The system claimed in claim 8, wherein said determining means is a microprocessor that is coupled to the output of said photocell so that said microprocessor will be able to output the polarity of said magnetic field and the number of times said magnet should move said aperture blades to form the correct aperture opening.

10. The system claimed in claim 8, wherein said determining means is a microprocessor that is coupled to the output of said photocell so that said microprocessor will be able to output the polarity of said magnetic field and the duration of time said magnet should move said one or more shutter blades away from the aperture opening.

11. The system claimed in claim 5, wherein said polarity setting means comprises:
   means coupled to the output of said polarity determining means for decoding the output of said determining means;
   first logic means coupled to the output of said decoding means, said current source and to the first end of said coil for transmitting a signal that represents a first magnetic polarity;
   second logic means coupled to the output of said decoding means, said current source, said first logic means and the second end of said coil for receiving said first polarity signal;
   third logic means coupled to the output of said decoding means, said current source and to the second end of said coil for transmitting a signal that represents a second magnetic polarity; and
   fourth logic means coupled to the output of said decoding means, said current source, said third logic means and the first end of said coil for receiving said second polarity signal.

12. The system claimed in claim 11, wherein said decoding means is a decoder.

13. The system claimed in claim 11, wherein said first logic means, said second logic means, said third logic means and said fourth logic means are transistors.

14. A multi-aperture electromagnetic camera shuttering system that utilizes one or more aperture blades for producing a plurality of aperture openings and one or more shutter blades for regulating the amount of light that is allowed to enter the aperture opening, said system comprises:
   an armature comprising: a core; and a coil, said coil is capable of receiving current and said armature will produce a first magnetic field;
   a magnet that produces a second magnetic field, said magnet is coupled to said first magnetic field;
   means coupled to one or more of said aperture blades for moving one or more of said aperture blades to different positions to form a plurality of aperture openings;
   means coupled to said magnet and said one or more of said shutter blades, for moving one or more shutter blades past said aperture opening; and
   means coupled to said armature for controlling the presence or absence of said first magnetic field and the polarity of said first magnetic field so that if said armature has one polarity said magnet will move said aperture moving means to cause said one or more aperture blades to form one of a plurality of said aperture openings and if said armature has a second polarity said magnet will move said shutter moving means and said one or more shutter blades past the opening formed by said aperture blades and allow light to enter the optical path of said camera;
   whereby, each time said controlling means causes said magnet to move said aperture moving means, said aperture blades will form a different aperture opening.

15. The system claimed in claim 14, wherein said shutter moving means is a member.

16. The system claimed in claim 14, wherein said aperture moving means comprises:
   a movable ring that is coupled to said one or more aperture blades, so that when said ring rotates a predetermined distance, said one or more aperture blades move a predetermined distance; and
   means for rotating said ring a predetermined distance, said rotating means is coupled to said magnet and said ring.

17. The system claimed in claim 16, wherein said rotating means comprises: a cam that contains a plurality of radii steps, said cam is coupled to said movable ring and said magnet.

18. The system claimed in claim 17, further including a ratchet that is coupled to said magnet and said cam so that when said magnet moves said ratchet, said ratchet causes said cam to move one or more radii steps.

19. The system claimed in claim 14 wherein said controlling means comprises:
   means for sensing the amount of light that is available to take a picture;
   means coupled to the output of said light sensing means for determining the polarity of said magnetic field; and
   means coupled to the output of said determining means and said coil for setting the polarity of said magnetic field.

20. The system claimed in claim 19 further including detecting means coupled to said determining means for noting the orientation of said moving means.

21. The system claimed in claim 20, wherein said detecting means is a sensor.

22. The system claimed in claim 19, wherein said light sensing means is a photocell that outputs voltages that are proportional to the amount of light said photocell senses.

23. The system claimed in claim 22, wherein said determining means is a microprocessor that is coupled to the output of said photocell so that said microprocessor will be able to output the polarity of said magnetic field and the number of times said magnet should move said aperture blades to form the correct aperture opening.

24. The system claimed in claim 22, wherein said determining means is a microprocessor that is coupled to the output of said photocell so that said microprocessor will be able to output the polarity of said magnetic field and the duration of time said magnet should move said one or more shutter blades away from the aperture opening.

25. The system claimed in claim 19, wherein said polarity setting means comprises:

means coupled to the output of said polarity determining means for decoding the output of said determining means;

first logic means coupled to the output of said decoding means, said current source and to the first end of said coil for transmitting a signal that represents a first magnetic polarity;

second logic means coupled to the output of said decoding means, said current source, said first logic means and the second end of said coil for receiving said first polarity signal;

third logic means coupled to the output of said decoding means, said current source and to the second end of said coil for transmitting a signal that represents a second magnetic polarity; and fourth logic means coupled to the output of said decoding means, said current source, said third logic means and the first end of said coil for receiving said second polarity signal.

26. The system claimed in claim 25, wherein said decoding means is a decoder.

27. The system claimed in claim 25, wherein said first logic means, said second logic means, said third logic means and said fourth logic means are transistors.

* * * * *

UNITED STATES PATENT AND TRADEMARK OFFICE
CERTIFICATE OF CORRECTION

PATENT NO. : 5,150,149
DATED : September 22, 1992
INVENTOR(S) : John H. Alligood, John H. Minnick and David A. Castor It is certified that error appears in the above-identified patent and that said Letters Patent is hereby corrected as shown below:

Column 12, line 13          The first "coil" should read --core--.

Signed and Sealed this

Thirtieth Day of November, 1993

Attest:

BRUCE LEHMAN

Attesting Officer        Commissioner of Patents and Trademarks